United States Patent [19]
Koch et al.

[11] Patent Number: 5,707,512
[45] Date of Patent: Jan. 13, 1998

[54] APPARATUS FOR THE SEPARATION OF SOLID-LIQUID MIXTURES

[75] Inventors: Manfred Koch, Graz; Hubert Riemer, St.Oswald; Reinhard Pinter, Graz, all of Austria

[73] Assignee: Patentverwaltungs-Gesellschaft m.b.H., Graz, Austria

[21] Appl. No.: 600,192

[22] Filed: Feb. 12, 1996

Related U.S. Application Data

[62] Division of Ser. No. 145,857, Nov. 5, 1993, Pat. No. 5,540,846.

[30] Foreign Application Priority Data

Nov. 6, 1992 [AT] Austria ................... 2194/92

[51] Int. Cl.⁶ ............... B01D 21/30; B01D 33/00
[52] U.S. Cl. ............ 210/136; 210/177; 210/178; 210/179; 210/184; 210/186; 210/209; 210/216; 210/217; 210/219; 210/330; 210/331; 210/383; 210/398; 210/402; 210/416
[58] Field of Search ................ 210/330, 331, 210/90, 136, 177, 178, 179, 184, 186, 198.1, 209, 210, 216, 217, 219, 359, 383, 398, 402, 403, 416

[56] References Cited

U.S. PATENT DOCUMENTS

| | | | |
|---|---|---|---|
| 2,899,066 | 8/1959 | Peterson et al. | 210/383 |
| 3,954,069 | 5/1976 | Loken | 110/221 |
| 3,985,858 | 10/1976 | Cosgrove . | |
| 4,134,835 | 1/1979 | Solum et al. | 210/331 |
| 4,293,411 | 10/1981 | Davis | 210/331 |
| 4,477,358 | 10/1984 | Heintges et al. | 210/783 |
| 4,648,332 | 3/1987 | Goedhart | 588/228 |
| 4,670,634 | 6/1987 | Bridges et al. | 219/770 |
| 4,704,804 | 11/1987 | Wyatt et al. | 34/415 |
| 4,708,641 | 11/1987 | Meininger | 432/72 |
| 4,758,347 | 7/1988 | Henz et al. | 210/639 |
| 4,929,335 | 5/1990 | Ragnegard et al. | 210/331 |
| 4,956,088 | 9/1990 | Hindstrom | 210/331 |
| 4,962,592 | 10/1990 | Orizand | 34/263 |
| 4,966,978 | 10/1990 | Sato et al. | 548/469 |
| 4,974,335 | 12/1990 | Bege et al. | 34/424 |
| 4,984,594 | 1/1991 | Vinegar et al. | 134/21 |
| 5,022,852 | 6/1991 | Blasko et al. | 432/115 |
| 5,094,012 | 3/1992 | Rosenstock et al. | 34/468 |
| 5,098,481 | 3/1992 | Monlux | 134/19 |
| 5,103,578 | 4/1992 | Rickard | 34/92 |
| 5,188,739 | 2/1993 | Khan et al. | 210/774 |
| 5,190,405 | 3/1993 | Vinegar et al. | 405/128 |
| 5,200,033 | 4/1993 | Weitzman | 159/47.1 |
| 5,227,064 | 7/1993 | Strid | 210/406 |
| 5,253,597 | 10/1993 | Swanstrom et al. | 110/346 |

FOREIGN PATENT DOCUMENTS

| | | |
|---|---|---|
| 0235081 | 2/1987 | European Pat. Off. . |
| 2947329 | 5/1981 | Germany . |
| 3306362 | 9/1983 | Germany . |
| 3341666 | 5/1985 | Germany . |
| 3918327 | 12/1989 | Germany . |
| 3937952 | 5/1991 | Germany . |

*Primary Examiner*—Robert J. Popovics
*Attorney, Agent, or Firm*—Roylance,Abrams,Berdo & Goodman,L.L.P.

[57] ABSTRACT

The invention relates to a process for the separation, in particular filtration of liquids and solids from solid-liquid mixtures, such as from a mineral, ore, coal or sludge suspensions of contaminated earth. The processing space of the filtration apparatus is submitted to overpressure and includes a collector container for solid-liquid mixture, a pressure filter, a discharge system and container for condensate and solid matter. The separation or filtration takes place at an overpressure and at an elevated temperature, preferably 40° C. to 300° C., conveniently 60° C. to 200° C., preferably about 150° C. The pressure filter device communicates with a source for a heated medium.

25 Claims, 6 Drawing Sheets

APPARATUS FOR THE SEPARATION OF SOLID-LIQUID MIXTURES

This application is a divisional application of Ser. No. 08/145,857, filed Nov. 5, 1993, now U.S. Pat. No. 5,540,846.

FIELD OF THE INVENTION

The present invention relates to a process and apparatus for the separation, and particularly the filtration of liquids and solids from liquid-solid mixtures. In particular, the invention is directed to a process for filtering a mineral solid-liquid suspension, such as an ore or coal suspension or sludge of contaminated earth. The processing space in the filtration apparatus is submitted to overpressure. The apparatus includes a collector container for a liquid-solid mixture, or liquid-solid suspension, a pressure filter, a discharge system and container for condensate and solid matter.

BACKGROUND OF THE INVENTION

Numerous processes and installations have already successfully been employed in the field of mineral processing for the treatment of ore and coal concentrates. A special variant of a pressure filter suitable therefor is described in German Patent No. 2,947,329 to Stahl. However, this system does not satisfy the requirements for the dehumidification of ore or coal concentrates or for an application for the decontamination of contaminated earth.

SUMMARY OF THE INVENTION

The present invention is directed to a process for the separation, in particular filtration of solids and liquids from solid-liquid mixtures, and in particular from mineral solid-liquid suspensions. The process filters the solid-liquid mixture at an overpressure and at an elevated temperature. The filtration is carried out at about 40° C. to 300° C., conveniently 60° C. to 200° C., preferably about 150° C. The elevated temperature primarily reduces the viscosity of the liquid to be expelled which makes it easier to expel the liquid. Reducing the viscosity is particularly advantageous in pressure filtration processes which results in very low residual moisture values. According to the invention, the elevated temperature may be generated by means of vapor, in particular steam, for instance at 110° C. to 200° C., and advantageously about 150° C. According to a preferred embodiment of the invention, the pressure filter communicates with a vapor source.

By using vapor, in particular steam, it is possible to obtain very low residual moisture contents in ore and coal concentrates, which are not obtainable with air as the filtration medium. Furthermore, it is also possible to separate dangerous substances, as, for instance, trinitrotoluene (TNT) from contaminated earth by dissolving the substances in the vapor or condensate.

In an embodiment of the process according to the invention, the temperature for the separation or filtration is generated in the whole process space by means of vapor, in particular steam. Thus, the known pressure filters may practically be employed.

A further advantageous embodiment of the process according to the present invention comprises generating an overpressure for the separation or filtration by means of vapor, and in particular steam, in a space separated from the rest of the process space. Although separation of the filtration space is necessary in this embodiment, there is considerable saving of vapor. In addition, the supplementary aggregates housed in the pressure filter container are easier to handle. In this process, only the filter has to be adapted to the elevated temperatures.

In further embodiments of the invention, the vapor is saturated or the vapor is superheated steam. The choice of the suitable type of process is made in accordance with the respective requirements as to the separation or filtration of the mixture, and in particular the particular material to be filtered.

According to an advantageous development of the invention, the condensed steam or vapor is discharged together with the liquid to be expelled, for example, water or TNT. Elaborate separation steps for the condensed vapor from the liquid to be expelled may be avoided by appropriate choice of the vapor pressure medium.

In a further preferred embodiment of the invention, the solid matter heated by the vapor and separated from the liquid, for instance the ore or coal concentrate or decontaminated earth, is separately submitted to further processing.

A further embodiment of the process according to the invention comprises generating heated compressed air to produce the temperature for filtration. The air is heated to about 40° C. to 300° C., conveniently 60° C. to 200° C., and preferably about 150° C. The compressed air necessary for generating pressure or compressed air produced from another process in the plant may be used for the filtering operation.

According to the present invention, the elevated temperature in the whole process space may be generated by heated compressed air. Thus, the known pressure filters may be used in the process. According to a further embodiment of the invention, the elevated temperature may also be generated by heated compressed air in a space separated from the rest of the process space. By direct impingement of the heated air on the filter cake, the energy losses in the pressure chamber are largely reduced.

A further embodiment according to the invention comprises supplying the solid-liquid mixture or solid-liquid suspension to the filter at an elevated temperature. The solid-liquid mixture is generally heated to about 40° C. to 300° C., conveniently 60° C. to 200° C., and preferably about 80° C. In embodiments, the mixture or suspension is heated before it enters the filter. By this process, a considerably more favorable separation or filtration, and thus, considerably lower residual moisture values may be obtained without substantially modifying the pressure filter.

According to the invention, economical operation is achieved by controlling the air pressure in the container or chamber space of the filter in response to the vapor pressure. In further embodiments, it is desirable to control the vapor pressure in response to the air pressure in the container and chamber space of the filter. The separation or filtration of the mixture or suspension may be further increased by subjecting the mixture or suspension to a movement in addition to the usual movement of separation through the filtration device or filter trough. The additional or induced movement in the mixture or suspension prevents the undesired sedimentation and rapid obstruction of the filter elements, or sieve openings. The additional movement of the mixture or suspension in combination with higher working pressure and elevated working temperature results in particularly progressive separation or filtration effects and high separation or filtration performance, at favorably low expenditures of energy.

A filtration installation according to the invention for carrying out the process comprises a pressure filter communicating with a source of heated medium. According to an embodiment of the invention, the source is a steam source.

In a further embodiment of the invention, the filtration container or filtration chamber of the pressure filter communicates with the vapor source such that the whole processing space is filled with steam in a particularly easy manner.

Alternatively, the steam source may communicate with a separate vapor dome in the interior of the filtration container of the pressure filter. In this manner, a specifically defined space for steam pressure filtration is separated from the rest of the processing space. This arrangement eliminates the need for special types of the materials for the other aggregates situated in the container of the pressure filter, such as control heads, snap-blow valves, drives, controlling equipments, measuring probes, and electric lines.

A favorable development of the invention comprises a vapor dome communicating with the filter trough of the rotary filter such as a rotary disk or drum filter. In this way, the steam required for filtration may be fed to the region of the filter surface, in particular to the dehumidification region, in a controlled manner, thus minimizing the loss of steam and energy.

The vapor dome, material discharge and the conveyance system are tightly connected to the discharge opening of the pressure filter container to avoid loss of steam and energy and thus to avoid heating up the remaining process space. Dangerous or toxic substances may also be separated from the rest of the process space and discharged or disposed of in a controlled manner.

According to a further embodiment, the source of heated medium is a source of heated compressed air. According to the invention, this source may either communicate with the chamber of the pressure filter or with a separate dome connected to the filter trough of the rotary filter in the interior of the container of the pressure filter.

According to a further embodiment of the invention, the source for heated medium is a supply of hot solid-liquid mixture or solid-liquid suspension.

An advantageous embodiment of the invention comprises a rotary filtration device including a vapor dome provided with outlets on both sides of the filter disk for the steam or the heated compressed air. By this construction, the steam or the heated compressed air may be directly applied to the filter cake on the filter disk. According to a further favorable modification of the invention, the vapor dome communicates with the pressure space via at least one valve flap. The valve flap may open towards the pressure space or the steam space. In alternative embodiments, the vapor dome includes a combination of two flaps. Preferably, the valve flap opens at a pressure difference of about 0.05 bar. Thus, the vapor dome need not be reinforced.

According to the invention, economical operation is ensured by providing a means for controlling the air pressure in the container or chamber space of the filter in relation to the vapor pressure. It may also be desirable to have a means for controlling the vapor pressure in relation to the air pressure in the container or chamber space of the filter in the system. A particularly advanced separation or filtration may be achieved by providing in combination with the elevated temperature and overpressure, a means such as an agitator in the mixture or suspension to produce a movement of or in the mixture or suspension, in addition to the usual movement of separation in the filter trough.

BRIEF DESCRIPTION OF THE DRAWINGS

Referring to the drawings which form a part of the original disclosure.

DETAILED DESCRIPTION OF THE INVENTION

Figure 1:
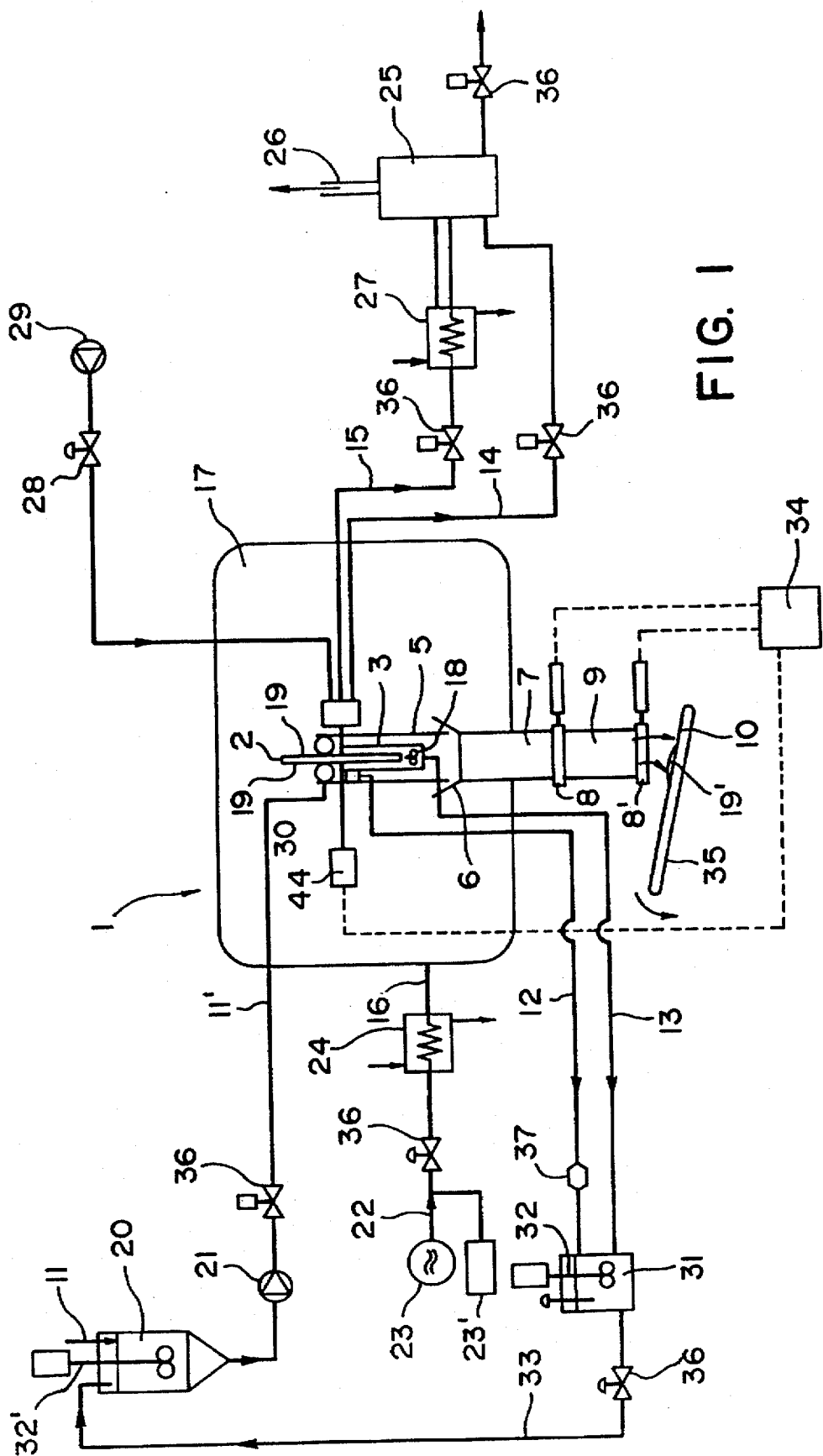
FIG. 1 illustrates a process scheme according to the invention.

The process according to the invention will now be described briefly with reference to FIG. 1. The mineral suspension or sludge of an ore or coal preparation or contaminated earth is delivered from a source 11 to a collector container 20 with agitator 32' at an appropriate hydrostatic admission pressure when it is transferred by means of pump 21 and pumped from above into the filter trough 3 via a filtrate feeding device 30. The filter trough 3 is installed in the pressure chamber 1 to define a pressure space 17. In order to avoid uneven concentration of solid matter in the suspension, the trough 3 is provided with continuous overflow 12 positioned at the upper end of trough 3 and discharge outlet 13 positioned at the bottom of the trough 3. The flow of the sludge through the filter trough 3 and homogenization of the sludge is maintained by means of an agitator 18 also shown in FIG. 1 to FIG. 4. The flow of the sludge supply pump 21 is controlled automatically by the electric motor controlled by a frequency transformer (not shown) in relation to the amount of overflow of sludge through overflow 12. The amount of overflow of sludge is registered by a flow-rate measurement station 37. The overflow stream 12 and the discharge stream 13 flow into a suspension collecting container 31 with agitator 32 in the form of a pressure agitation container by gravimetric fall. From the pressure container 31 the sludge may be conveyed through recirculation line 33 and control valve 36 back to the collector container 20 via a level-controlled pump (not shown) having an immersed suction pipe or by way of pressure gradient.

The filter disk 2 is supplied with compressed air from a station for compressed air, for instance an air compressor 23 through line 22 and control valve 36, or steam from a steam source 23' as a working medium. The air and/or steam may also be brought to the required temperature by means of a heater 24 before entering the pressure space. The heated air or steam is passed from heater 24 through line 16 to pressure chamber 1.

Figure 4:
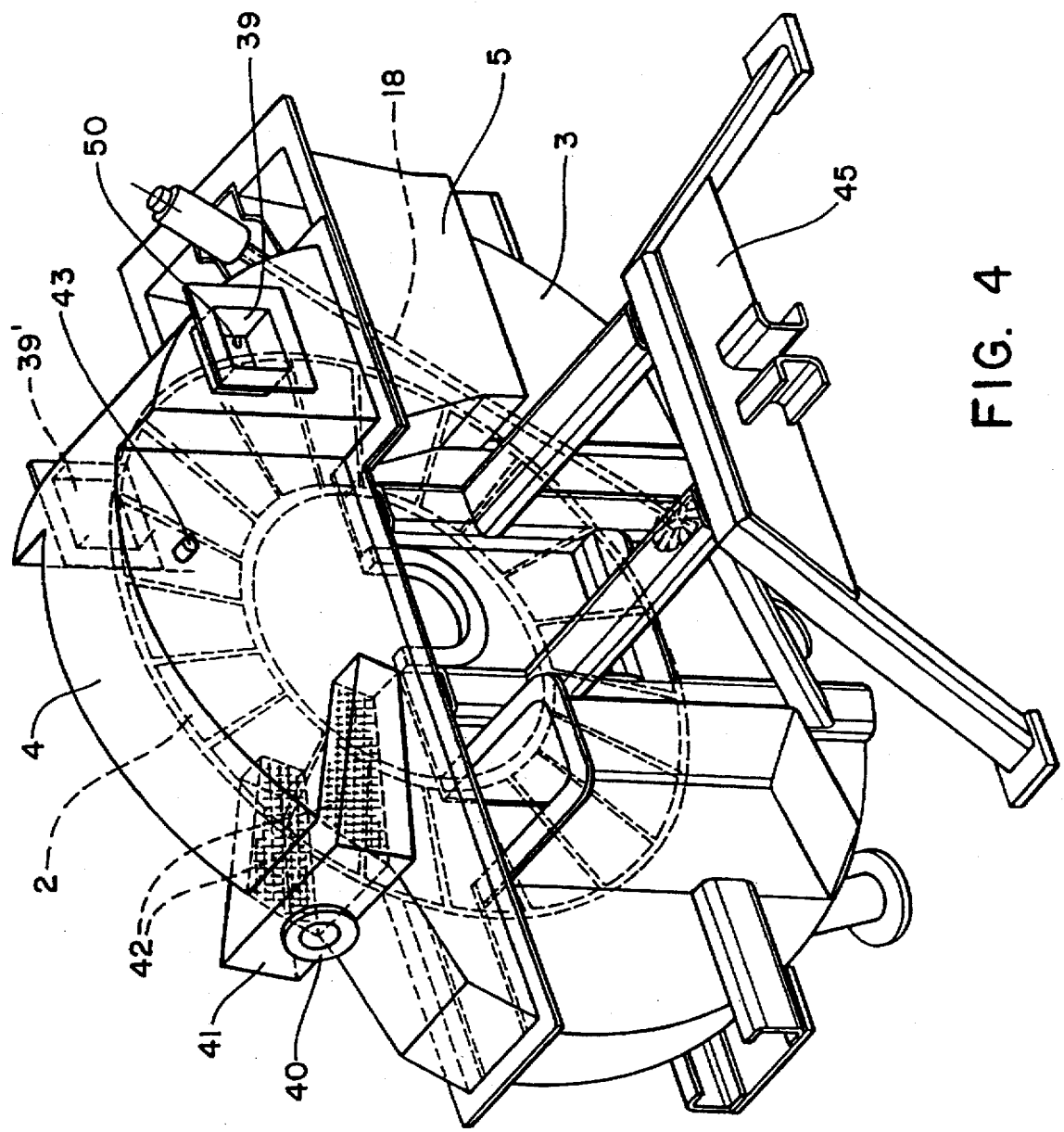
FIG. 4 shows the core of an installation or arrangement according to the invention for carrying out the process.

The filter 2 is a hollow filtr disk rotating on a shaft, having separate sectors adjacent to each other (see FIG. 4). The interior spaces of each sector is provided with separate filtrate discharge conduits. The shaft is formed as a hollow shaft on one side of the filter disk in known fashion, in the interior of which hollow shaft die filtrate discharge conduits are guided and discharge into outlet openings arranged in a front cover disk of the hollow shaft and equally spaced from each other along a circumference. The front cover disk forms the rotating part of the distributing slide, typically referred to as the control head.

In operation of the filter disk 2, filtration is carried out in the region of immersion of the filter disk 2 into the solid-liquid-mixture contained in the filter trough 3 to the effect that liquid is forced through the filter layer into the interior of the respective sectors, while solids accumulates as a layer on the filter surface. In the pressue gas chamber 1 outside the region of immersion of the filter disk 2, compressed gas is forced through the solid layer that has been built up and guides the liquid remaining in the solid layer off into the interior of the sectors concerned, condensation occuring at the filter when steam is used as the pressure medium in case the temperature falls below the dew point of the steam.

Thus, the filtration process results, in practically pure liquid (the cake formation filtrate) and, a gas-liquid-mixture (the dehumidification filtrate). The liquid content of the filter cake is normally lower the longer the filter sector is out of the filter trough 3.

Generally, cake formation filtrate and dehumidification filtrate are separated from each other. The filtrates separated by the filter are discharged via separate discharge conduits. To separate the filtrates, the control head is provided with a fixed counter disk on the front cover disk of the hollow shaft, on which the front cover disk glides as a snug fit. The fixed counter disk is provided with peripheral slots uniting the outlet openings of the front cover disk carrying the cake formation filtrate and the outlet openings of the front cover disk carrying dehumidification filtrate.

The cake formation filtrate 14 having as little air content as possible flows through control valve 36 into a filtrate separator 25 into which the dehumidification filtrate 15 is also introduced after cooling in the air/gas cooler 27 wherein the condensate is precipitated. The stream of exhaust air escapes from the top 26 of the filtrate separator 25. The separated filtrate-condensate mixture may accordingly be disposed. The dewatered solid matter (ore concentrate, coal concentrate) or the decontaminated earth 10 is discharged through sluice gates 7, 8, 8', 9. The filter cake is removed from the filter disk 2 by means of snap-blow valve 28 and compressed air from the snap-blow compressor 29. The filter cake falls through chute 5 mounted on both sides of the filter disk 2 into a funnel 6 leading to the sluice collector container 7. Sluice gates 8, 8' are alternatively opened and closed to allow the filter cake to fall into the intermediate sluice chamber 9 and subsequently to the filter cake discharge 10. The sluice gates 8, 8' are operated by an hydraulic aggregate 34. The discharged filter cake 19' is transported away by means of a conveyor belt 35. The amount of air, vapor, suspension supply, overflow, discharge, as well as the amount of filtrate, may be controlled by control valves 36. The appropriate conduits are also completely closed as needed.

Figure 2:
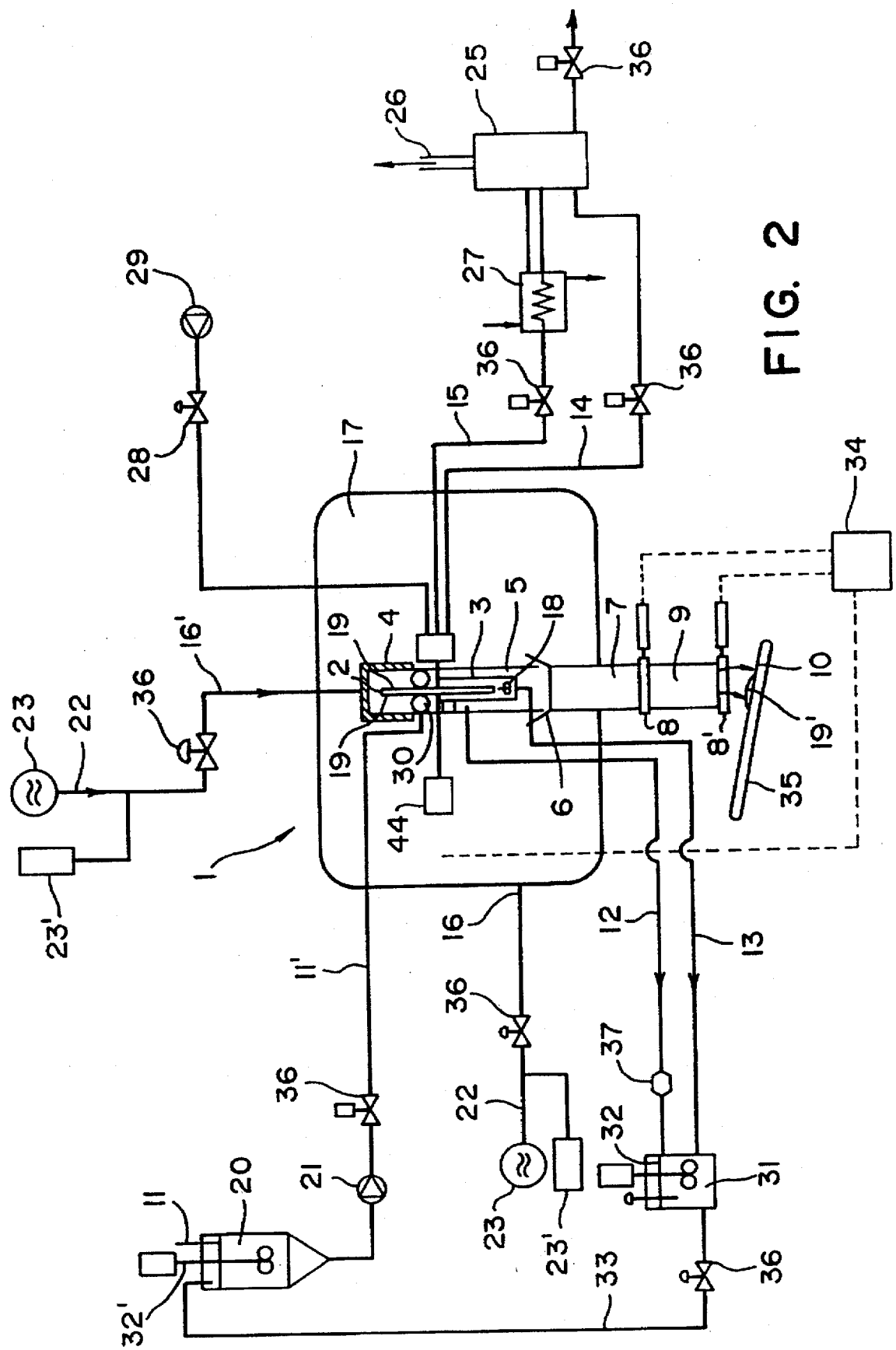
FIG. 2 shows a modification of the process according to an alternative embodiment.

FIG. 2 shows a modification of the process according to the embodiment of FIG. 1, where the steam or the heated air are guided into a vapor dome 4 mounted above the filter disk 2. The structural elements which are the same as in the embodiment of FIG. 1 are identified by the same reference numbers. The vapor dome 4 is positioned above the filter trough 3 and is temperature-isolated. The compressed air required for generating the pressure in the pressure chamber 1 flows into the pressure space 17 positioned outside the vapor dome 4 as warm air at equal pressure to the vapor dome 4. The pressure space 17 is pressurized from compressor 23 through line 22, valve 36 and line 16. The air from the compressor is preferably not preheated or cooled before entering the pressure space 17. When using steam to achieve filtration at elevated temperature, the air pressure is adjusted to about 4.0 bar in absolute figures. This corresponds to a temperature of the saturated steam of 143.6° C. The air pressure is measured and constitutes the control input for the vapor pressure to be adjusted in the chamber space 17. This is readjusted to the air pressure to delta-p approx.<=0.05 bar. The regulation of the pressure difference between air space 17 and vapor dome 4 is done in such a way that steam preferably escapes into the air space. The vapor dome 4 is not pressure-sealed to the filter trough 3. In the embodiment shown in FIG. 2, a compressor 23 and steam source 23' are connected to the dome 4 by lines 22 and 16.

Controlled pressure compensation between vapor dome 4 and air space 17 in the filter chamber 1 (gap, bore, valve) is provided.

The system of the invention allows for some moderate transfer of air into the vapor space of the vapor dome 4. If the air is cooler than the steam, it is rapidly heated up by the steam. The temperature of the gas mixture will decrease only little.

Figure 3:
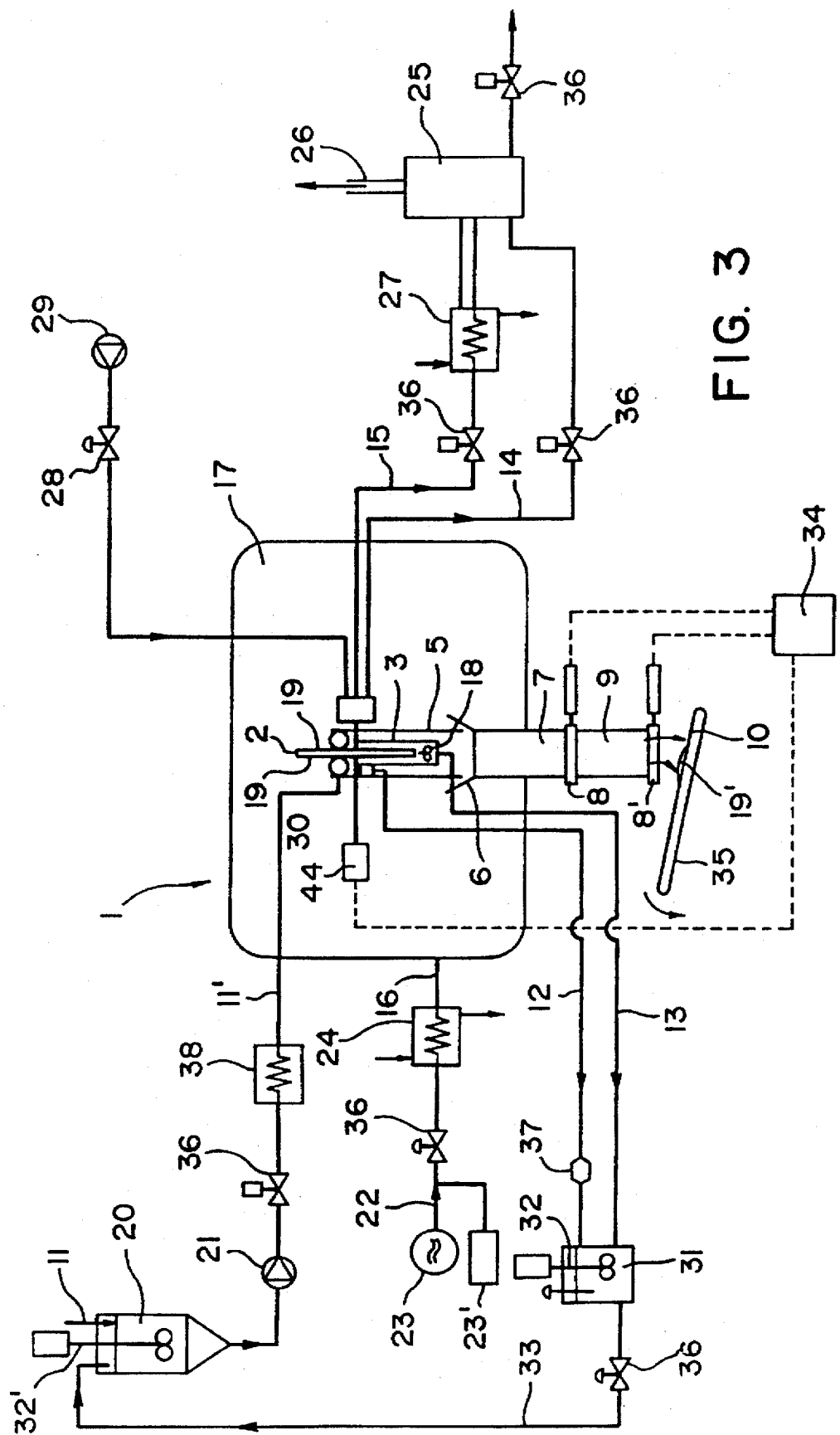
FIG. 3 shows a further modification of the process according to the invention.

FIG. 3 illustrates a further modification of the invention wherein the suspension is brought to the filtration apparatus in a heated state. The same structural elements of FIG. 1 are identified by the same reference number. In some situations, the suspension to be filtered is already at a high temperature before being introduced into the suspension collector container. For example, waste liquor from an aluminum process and red mud results in a suspension at temperatures of above 200° C. In this process, it is necessary to cool the suspension before filtration. In most cases, however, the suspension must be additionally pre-heated in a heater 38 before being supplied to the filter trough 3. The hot suspension has a lower viscosity compared to unheated mixture. The reduced viscosity permits the liquid to easily separate from the solid matter. The use of heated compressed air or steam reduces viscosity of the liquid to be expelled to contribute to better filtration.

FIG. 4 illustrates a preferred embodiment for carrying out the process where the apparatus is a single-disk filter with a filter disk 2 and filter trough 3 supported by stand 45. An agitator 18 is positioned in the filter trough 3 to homogenize the suspension or sludge. The filter trough as shown is mounted on a stand 45. A vapor dome 4 is provided with openings 39, 39' for pressure holding flaps 50 mounted above the filter trough 3. These flaps open in dependence on the pressure difference between vapor dome 4 and pressure space 17 as shown in FIGS. 1–3 in which the filter 2 is positioned. The flaps may be adjusted to a specific limiting value for opening by means of elastic force or counter weights. The steam or the heated compressed air are guided into a vapor chamber 41 via a muff 40. The steam or the heated compressed air are then guided directly onto the filter cake 19 already formed through openings 42 provided on both sides of the filter disk 2. The filter disk may be in the form of a perforated plate. The temperature and/or the pressure in the vapor dome is measured by measuring probes 43 and regulated according to the filtering requirements. For special applications, for instance for the filtration of readily sedimenting substances, further installations, for instance guiding plates, special suspension feeding and discharge means, may be provided for homogenizing the sludge in the filter trough. The filter cake is removed from the filter disk and dropped through chutes 5 and the funnel 6 to discharge sluice 7, 9. In embodiments, the chute 5 and funnel 6 are tightly connected with each other.

Figure 5:
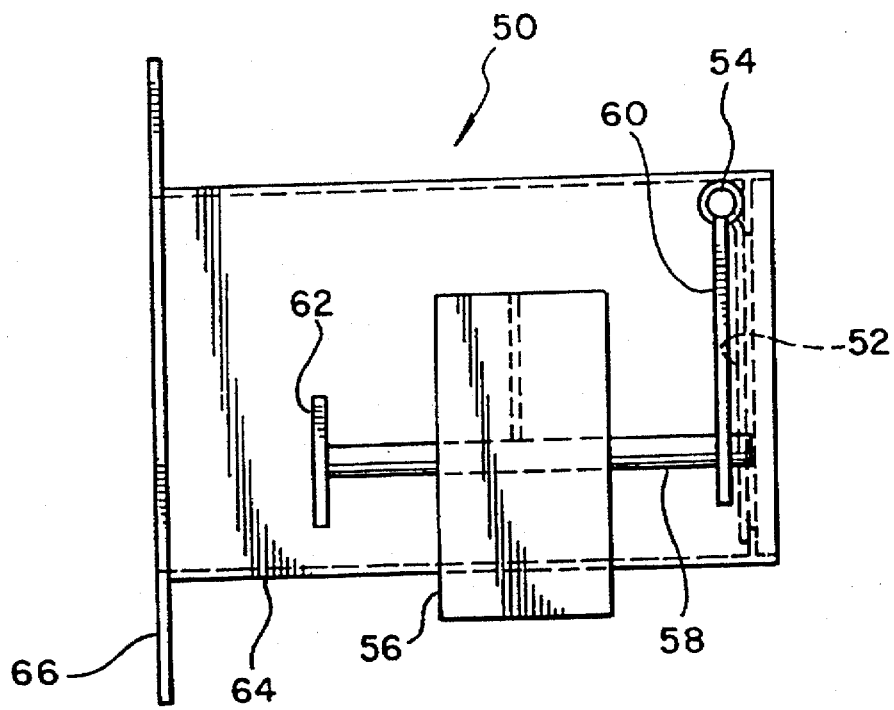
FIG. 5 is a side view of the flap valve assembly on the pressure container.
Figure 6:
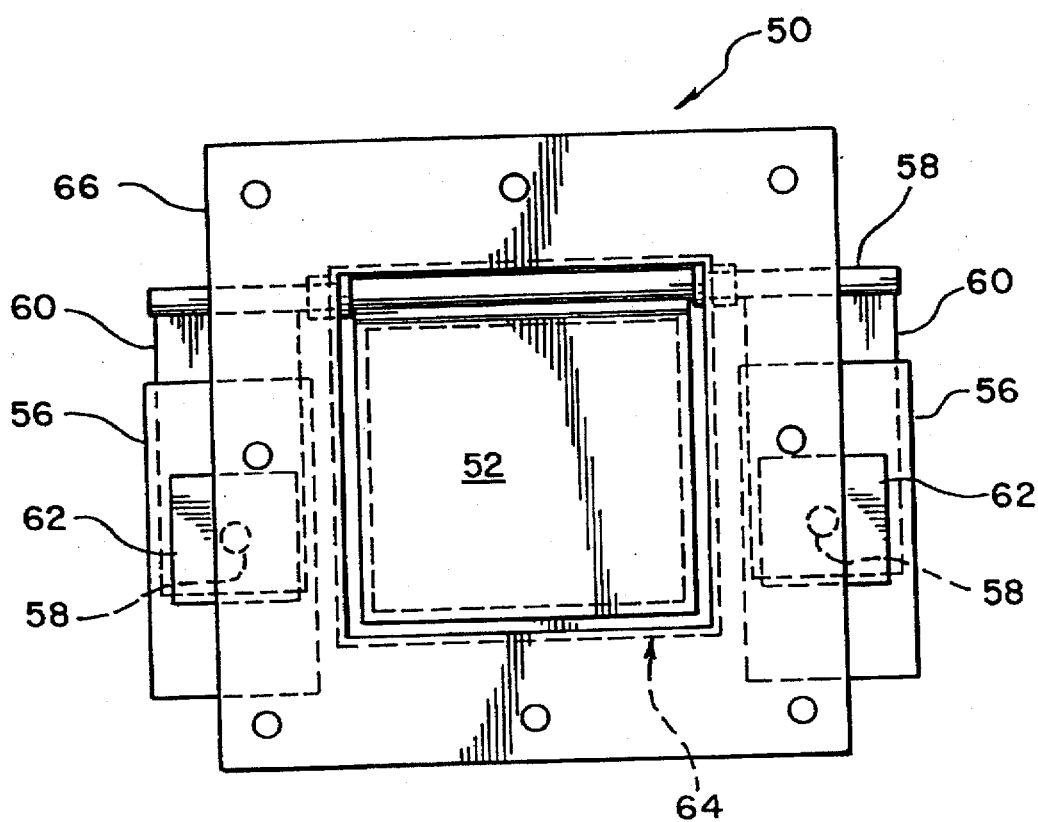
FIG. 6 is a front view of the flap valve assembly of FIG. 5.
Figure 7:
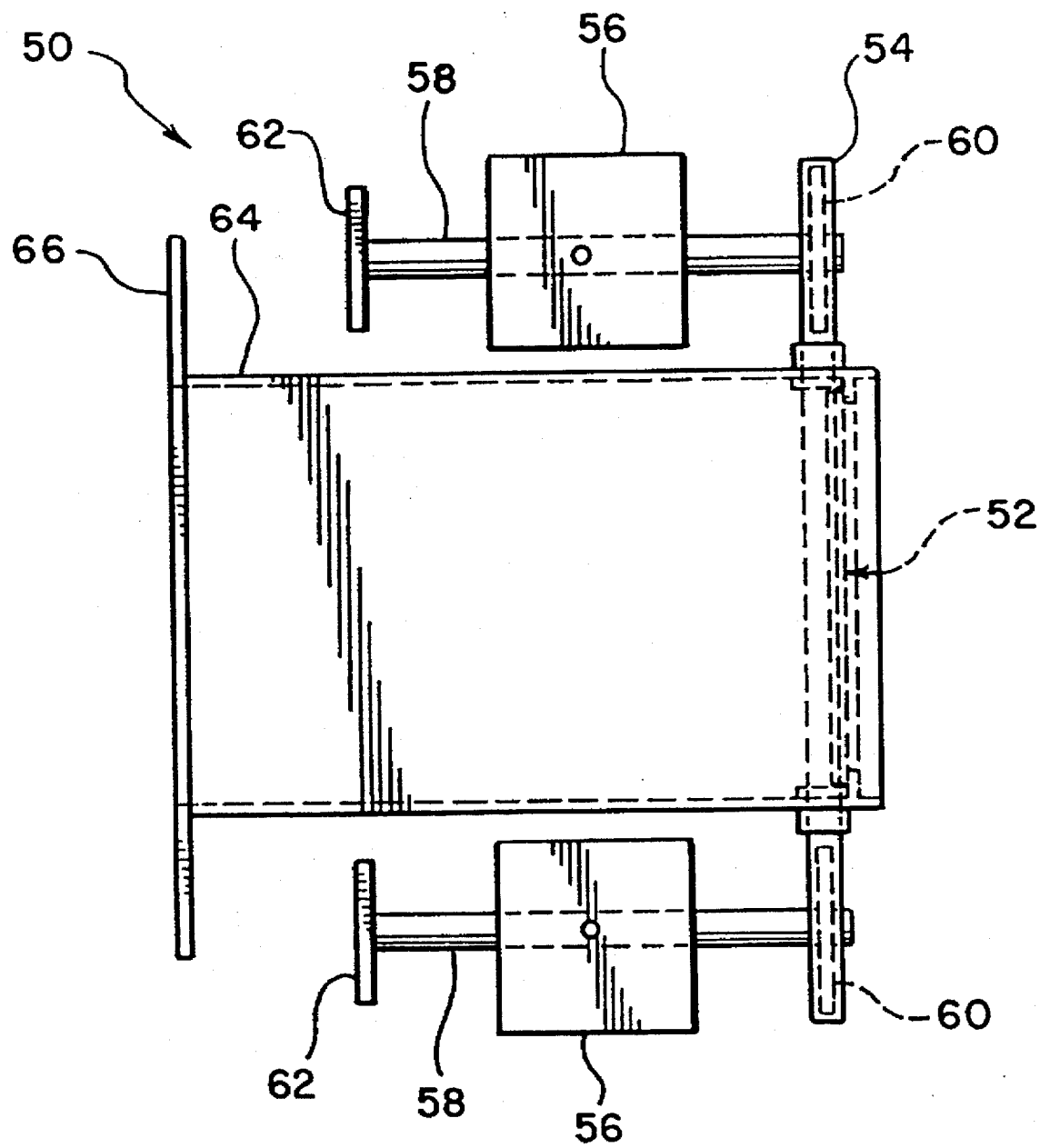
FIG. 7 is a top view of the flap valve assembly of FIG. 5.

FIGS. 5–7 illustrate one embodiment of the pressure actuated flap valves 50 which are used in the openings 39 of filter device 4. Flap valves 50 include valve plate 52 connected to a pivot shaft 54. A pair of adjustable weights 56 are slidably mounted on shafts 58. One end of the shafts 58 are connected to pivot shaft 54 by plate member 60. The opposite end of shafts 58 includes a stop member 62. The position of the weights 56 on shafts 58 determine the amount of force necessary to open the valve flaps. The valve flaps are pivotally mounted in a duct 64 which is coupled to the filter device 4 at the openings 39 by a mounting collar 66.

The examples only serve to illustrate the invention. Other applications, for instance with rotary filters having several disks, drum filters or also band filters in the pressure chamber may be used. The application of the invention to the separation and filtration of solid-liquid mixtures may be of considerable advantage under certain circumstances to carry out the process economically.

What is claimed is:

1. An apparatus for filtering solid-liquid mixtures comprising:

means for defining a first pressure space;

a collector container having an inlet for the solid-liquid mixture, said container being positioned within said first pressure space;

pressure filter means disposed in said container for filtering said mixture and separating solids from said mixture;

a liquid discharge from said container;

a condensate and solids collection means connected to said container;

a pressure chamber coupled to said collector container and enclosing said filter means and solid-liquid mixture and defining a second pressure space contained within said first pressure space; and a source of heated fluid medium connected to said container to heat said second pressure space and said mixture while being filtered.

2. An apparatus according to claim 1, wherein said fluid medium source is a source of heated vapor.

3. An apparatus according to claim 2, wherein said vapor source is in fluid communication with said pressure chamber in said container.

4. An apparatus according to claim 1, comprising a separate vapor dome in an interior portion of said container defining said pressure chamber, said dome being in fluid communication with said heated fluid medium.

5. An apparatus according to claim 4, said filter means comprising a rotary filter and a filter trough, said vapor dome being connected to said trough.

6. An apparatus according to claim 4, said vapor dome comprising a material discharge and a conveyance system tightly connected to a discharge opening.

7. An apparatus according to claim 4, said vapor dome comprising outlets for said heated fluid medium on each side of the filter means.

8. An apparatus according to claim 7, said vapor dome being in fluid communication with the first pressure space and said outlets including at least one valve flap.

9. An apparatus according to claim 8, wherein said at least one valve flap opens towards said first pressure space.

10. An apparatus according to claim 8, wherein said at least one valve flap opens towards said vapor dome.

11. An apparatus according to claim 8, said at least one flap valve opening at a pressure difference of about 0.05 bar.

12. An apparatus according to claim 1, wherein said source of heated fluid is a heated compressed air source.

13. An apparatus according to claim 12, said filter means comprising a rotary filter, a filter trough and a vapor dome connected to said filter trough.

14. An apparatus according to claim 12, comprising means for controlling air pressure in said container or pressure space in relation to vapor pressure in said apparatus.

15. An apparatus according to claim 12, comprising means for controlling vapor pressure in said container or pressure space in relation to air pressure in said apparatus.

16. An apparatus according to claim 1, comprising means for heating said solid-liquid mixture at a remote location from said filter means.

17. An apparatus according to claim 1, comprising agitator means in said container to induce movement of said mixture in addition to a usual movement of said mixture through said apparatus for preventing settlement of solids in said container.

18. An apparatus according to claim 1, wherein the mixture is a mineral, ore, coal or sludge suspension of contaminated earth.

19. An apparatus for filtering a solid-liquid mixture, comprising:

a filter trough having an inlet for receiving said solid-liquid mixture;

a pressure filter means for filtering said solid-liquid mixture and separating solids from said mixture;

a liquid discharge means coupled to said trough;

a solid discharge means connected to said filter means;

means for defining a first pressure space enclosing said filter means and trough;

a dome coupled to said trough for completely enclosing said filter means and solid-liquid mixture and defining a second pressure space within said first pressure space and in fluid communication with said first pressure space;

a pressure medium source in fluid communication with said first pressure space for maintaining said first and second pressure spaces at an elevated pressure;

a pressure operated valve coupled to said dome providing said fluid communication between said first and second pressure spaces; and means for supplying a heated fluid to said second pressure space.

20. The apparatus of claim 19, wherein said filter means comprises rotary disk filter.

21. The apparatus of claim 19, wherein said pressure operated valve is a flap valve.

22. The apparatus of claim 19, wherein said dome substantially maintains said heated fluid in said second pressure space.

23. The apparatus of claim 19, wherein said fluid communication between said first and second pressure spaces maintains said second pressure space at substantially the same pressure as said first pressure space.

24. The apparatus of claim 19, wherein said means for supplying heated fluid comprises means for supplying steam or heated compressed air.

25. The apparatus of claim 19, wherein said filter means is a rotary filter.

* * * * *